United States Patent
Chen

(10) Patent No.: US 7,397,855 B2
(45) Date of Patent: Jul. 8, 2008

(54) RATE CONTROLLING METHOD AND APPARATUS FOR USE IN A TRANSCODER

(75) Inventor: Yi-Kai Chen, Tainan (TW)

(73) Assignee: Corel TW Corp., Taipei (TW)

( * ) Notice: Subject to any disclaimer, the term of this patent is extended or adjusted under 35 U.S.C. 154(b) by 854 days.

(21) Appl. No.: 10/823,576

(22) Filed: Apr. 14, 2004

(65) Prior Publication Data

US 2005/0232354 A1   Oct. 20, 2005

(51) Int. Cl.
*H04B 1/66* (2006.01)
*H04N 7/12* (2006.01)
*H04N 11/02* (2006.01)
*H04N 11/04* (2006.01)

(52) U.S. Cl. ................................. 375/240.04
(58) Field of Classification Search ............. 375/240.27
See application file for complete search history.

(56) References Cited

U.S. PATENT DOCUMENTS

| | | | | |
|---|---|---|---|---|
| 6,014,466 A * | 1/2000 | Xia et al. | .................... | 382/243 |
| 6,055,330 A * | 4/2000 | Eleftheriadis et al. | ....... | 382/154 |
| 6,466,624 B1 * | 10/2002 | Fogg | .................... | 375/240.27 |
| 6,587,508 B1 * | 7/2003 | Hanamura et al. | ..... | 375/240.24 |
| 6,825,886 B2 * | 11/2004 | Kobayashi et al. | ........ | 348/405.1 |
| 7,266,148 B2 * | 9/2007 | Kim | ...................... | 375/240.03 |
| 2002/0141503 A1 * | 10/2002 | Kobayashi et al. | ..... | 375/240.27 |
| 2003/0215011 A1 * | 11/2003 | Wang et al. | ............ | 375/240.03 |
| 2005/0053298 A1 * | 3/2005 | Mukerjee et al. | ............ | 382/236 |
| 2005/0111547 A1 * | 5/2005 | Holcomb et al. | ....... | 375/240.03 |

\* cited by examiner

*Primary Examiner*—Mehrdad Dastouri
*Assistant Examiner*—Jessica Roberts
(74) *Attorney, Agent, or Firm*—Birch, Stewart, Koalasch & Birch, LLP

(57) ABSTRACT

A rate controlling method for computing a reference quantization parameter is provided, for use in a transcoder having a variable length decoder, an inverse quantizer, a quantizer and a variable length encoder. The rate controlling method comprising: receiving an input quantization parameter and motion information for each of the macroblocks from the variable length decoder; analyzing the similarity of motion information between a current macroblock and its neighboring macroblocks to compute a scaling factor for the current macroblock when allocated within P- and B-pictures; computing a bit difference between a target outputting bit stream and a real outputting bit stream; estimating the fullness of a virtual buffer to encode the current macroblock in view of the scaling factor; and computing the reference parameter based on a target bit rate, the first quantization parameter and the bit difference.

2 Claims, 4 Drawing Sheets

RATE CONTROLLING METHOD AND APPARATUS FOR USE IN A TRANSCODER

BACKGROUND OF THE INVENTION

1. Field of the Invention

The present invention generally relates to a method and apparatus for transcoding a first coded moving picture sequence at a first bit rate into a second coded moving picture sequence at a second bit rate, lower than the first bit rate. In particular, the present invention relates to a method and apparatus for providing an accurate estimation of the fullness of the virtual buffer based on motion information of the input moving picture sequence, such that a better rate control can be achieved.

2. Description of the Prior Art

Recently, DVD-Video recording and Digital Video Recorder (DVR) have emerged in the industry. In these applications, a digital video signal associated with a digital audio signal is usually encoded and compressed into a MPEG-2 bit stream. However, the data rate of such digital video signal is varied and may depend on the source, such as HDTV at a bit rate of 19.2M bps and Sony MV at a bit rate of 12M bps. Therefore, a so-called transcoder is desired to convert an input MPEG-2 bit stream at a predetermined input bit rate into another output MPEG-2 bit stream at a predetermined output bit rate, lower than the predetermined input bit rate.

Referring to FIG. 1, there is shown a typical conventional transcoder. The conventional transcoder 100 has an input terminal a1 electrically connected to a first transmitting path, not shown, and an output terminal a2 electrically connected to a second transmitting path, not shown. The conventional transcoder 100 is designed to input a first bit stream b1 at a predetermined input bit rate through the input terminal a1, to convert the first bit stream b1 into a second bit stream b2 to be output at a predetermined output bit rate, i.e., a target bit rate, lower than the predetermined input bit rate of the first bit stream b1, and to output the second bit stream b2 through the output terminal a2.

The conventional transcoder 100 comprises a variable length decoder 101, referred to as "VLD" in the drawings, a de-quantizer 102, referred to as "IQ" in the drawings, a quantizer 103, referred to as "Q" in the drawings, a variable length encoder 104, referred to as "VLC" in the drawings, and a rate controller 105.

The variable length decoder 101 is electrically connected to the input terminal a1 and designed to decode a coded moving picture sequence signal within the first bit streams b1 inputted through the input terminal a1 to reconstruct an original picture data for each of the pictures, including a matrix of original quantization coefficients, referred to as "level", for each of the macroblocks within each of the pictures and an original quantization parameter, hereinafter referred to as "first quantization parameter Q1".

The de-quantizer 102 is electrically connected to the variable length decoder 101 and designed to input the matrix of original quantization coefficients level from the variable length decoder 101 and the first quantization parameter Q1. The de-quantizer 102 is further designed to inversely quantize the inputted matrix of original quantization coefficients level with the first quantization parameter Q1 to generate a matrix of de-quantization coefficients, referred to as "dequant", i.e., DCT coefficients, for each of the macroblocks as follows:

$$\text{Dequant} = \{2 \times \text{level} + \text{sign}(\text{level})\} \times (Q1 \times QM)/32 \quad (1)$$

$$\text{Dequant} = \text{level} \times (Q1 \times QM)/16 \quad (2)$$

where the equation (1) is used for the inter macroblock, while the equation (2) is used for the intra macroblock. QM is a matrix of quantization parameters stored in a predetermined quantization table. The first quantization parameter Q1 and the matrix of quantization parameters QM are derived from the first bit streams b1 by the variable length decoder 101. Here, the original quantization coefficients level, the de-quantization coefficients dequant, the matrix of quantization parameters QM, and the first quantization parameter Q1 are integers. The de-quantization coefficients dequant calculated by the equations (1) and (2) should be rounded down to the nearest one.

The quantizer 103 is electrically connected to the de-quantizer 102 and designed to input the matrix of de-quantization coefficients dequant from the de-quantizer 102 and then quantize the inputted matrix of de-quantization coefficients dequant for each of the macroblocks with a second quantization parameter, referred to as "Q2" hereinafter, to generate a matrix of re-quantization coefficients, referred to as "tlevel", as follows:

$$\text{tlevel} = \text{dequant} \times 16/(Q2 \times QM) \quad (3)$$

$$\text{tlevel} = \text{dequant} \times 16/(Q2 \times QM) + \text{sign}(\text{dequant})/2 \quad (4)$$

where the equation (3) is used for the inter macroblock, while the equation (4) is used for the intra macroblock. The second quantization parameter Q2 is obtained by the rate controller 105. Here, the re-quantization coefficients tlevel and the second quantization parameter Q2 are also integers. The re-quantization coefficients tlevel calculated by the equations (3) and (4) should be rounded down to the nearest one. Such rounding operation for the integers will be omitted from the later description for avoiding tedious repetition.

The variable length encoder 104 is electrically connected to the quantizer 103 and designed to input the re-quantization coefficients tlevel from the quantizer 103 and then encode the inputted matrix of the re-quantization coefficients tlevel to generate an objective picture data for each of pictures to sequentially output the objective picture data in the form of the second bit streams b2 through the output terminal a2. The variable length encoder 104 is further electrically connected to the variable length decoder 101 and designed to input a diversity of information included in the first bit streams b1 necessary for the second bit streams b2 from the variable length decoder 101.

The rate controller 105 is electrically connected to the de-quantizer 102 and designed to perform a rate control over the encoding in the conventional transcoder 100, for example, according to the TM5, a typical rate controlling method in MPEG-2 standard referenced to "ISO-IEC/JTC1/SC29/WG11/N0400 Test Model 5", on the basis of the information obtained from the de-quantizer 102 as described below.

Referring to FIG. 2 of the drawings, there is shown a flowchart of the rate controlling process according to TM-5 in the conventional transcoder 100. As shown in FIG. 2, the rate controlling process comprises steps A1 to A14.

In the step A1, "1" is assigned to the picture number variable n representing a serial number of pictures within the first bit streams b1. Hereinlater, the n-th picture in the first bit streams b1 is referred to as "pic(n)".

In the following step A2, a global complexity measure Xi, Xp, or Xb for the corresponding type of pictures, i.e., I, P or B-picture is computed as follows:

$$Xi = Si \times Qi \quad (5)$$

$$Xp = Sp \times Qp \quad (6)$$

$$Xb = Sb \times Qb \quad (7)$$

where Si, Sp, or Sb is the number of bits generated by encoding I, P or B-picture, and Qi, Qp, or Qb is the average quantization parameter computed by averaging the actual quantization values used during the quantization of the all macroblocks within I, P or B-picture. The average quantization parameters Qi, Qp, and Qb are normalized within a range of 1 to 31. The average quantization parameters Qi, Qp, and Qb respectively correspond to the first quantization parameters Q1 obtained from the variable length decoder 101.

The global complexity measure Xi, Xp, or Xb of the corresponding picture is inversely proportional to the compressing ratio of the moving picture, namely, a ratio of the volume of information in the second bit streams b2 to that in the first bit streams b1. Namely, as the volume of information on the first bit streams b1 becomes larger, the compressing ratio is decreased. Therefore, the global complexity measure Xi, Xp, or Xb of the corresponding picture becomes larger, as the compressing ratio is decreased. In contrast, the global complexity measure Xi, Xp, or Xb of the corresponding picture becomes smaller, as the compressing ratio is increased.

The initial value of global complexity measure Xi, Xp, or Xb of the corresponding picture is given as follows:

$$Xi = 160 \times Target\_Bitrate/115 \quad (8)$$

$$Xp = 60 \times Target\_Bitrate/115 \quad (9)$$

$$Xb = 42 \times Target\_Bitrate/115 \quad (10)$$

where Target_Bitrate is measured in bits/s and corresponds to the target bit rate of the first conventional transcoder 100.

In the following step A3, the target number of bits for the next picture in the current GROUP OF PICTURES Ti, Tp, or Tb is computed as:

$$Ti = R/(1 + NpXp/XiKp + NbXb/XiKb) \quad (11)$$

$$Tp = R/(Np + NbKpXb/KbXp) \quad (12)$$

$$Tb = R/(Nb + NpKbXp/KpXb) \quad (13)$$

where Np and Nb are the remaining number of P-pictures and B-pictures, respectively, remaining the current GROUP OF PICTURES in the encoding order. Kp and Kb are universal constants dependent on the quantization matrices. When it is assumed that Kp=1.0 and Kb=1.4, the quality of the image can be always optimized.

In the following step A4, the judgment is made whether the picture number variable n is "1" or not, i.e., the current picture is the first picture pic(1) or not. When the answer is "YES", i.e., the current picture is the first picture pic(1), the step A4 goes to the step A5. When, on the other hand, the answer is "NO", i.e., the current picture is not the first picture, the step A4 goes to the step A6. In the step A5, the remaining number of bits assigned to the GROUP OF PICTURES R is initialized according to the following equation (14). This remaining number of bits assigned to the GROUP OF PICTURES R is computed before encoding the first pictures pic(1) within the GROUP OF PICTURES, i.e., an I-picture, as follows:

$$R = Target\_Bitrate \times NPIC/picture\_rate + R \quad (14)$$

where NPIC is the total number of pictures in each of the GROUP OF PICTURES, and picture_rate is expressed in the number of decoded pictures per second. At the start of the sequence R=0.

In the step A6, the above remaining number of bits assigned to the GROUP OF PICTURES R is updated before encoding the current picture pic(n) as follows:

$$R = R - Si \quad (15)$$

$$R = R - Sp \quad (16)$$

$$R = R - Sb \quad (17)$$

where Si, Sp, or Sb is the number of bits generated in the previous picture pic(n−1) of the corresponding type (I, P or B) just encoded.

The step A5 or A6 goes to the step A7 wherein "1" is assigned to the macroblock number variable j (j>=1) representing a serial number of macroblocks within one of the pictures. Hereinlater the j-th macroblock in the picture is referred to as "MB(j)".

In the following step A8, the fullness of appropriate virtual buffer di(j), dp(j) or db(j) is computed depending on the picture type before encoding macroblock MB(j) as follows:

$$di(j) = di(0) + B(j-1) - Ti \times (j-1)/NMB \quad (18)$$

$$dp(j) = dp(0) + B(j-1) - Tp \times (j-1)/NMB \quad (19)$$

$$db(j) = db(0) + B(j-1) - Tb \times (j-1)/NMB \quad (20)$$

where B(j−1) is the number of bits generated by encoding all macroblocks in the picture up to including (j−1)th macroblock MB(j−1). NMB is the total number of macroblocks in the picture. di(j), dp(j), or db(j) is a fullness of virtual buffer at the j-th macroblock MB(j) for I, P or B-picture.

di(0), dp(0), or db(0) is an initial fullness of virtual buffer for I, P or B-picture and given by:

$$di(0) = 10 \times r/31 \quad (21)$$

$$dp(0) = Kp \times di(0) \quad (22)$$

$$db(0) = Kb \times di(0) \quad (23)$$

where r is referred to as "reaction parameter" and, used for the control of a reaction rate of the loop of feed back as follows:

$$r = 2 \times Target\_Bitrate/picture\_rate \quad (24)$$

The final fullness of the virtual buffer di(NMB), dp(NMB), or db(NMB) of the NMB-th macroblock MB(NMB) of the current picture pic(n) is used as di(0), dp(0), or db(0) for encoding the first macroblock MB(1) within the next picture pic(n+1) of the same type.

In the following step A9, the reference quantization parameter Q(j) for the j-th macroblock MB(j) in each of pictures is computed on the basis of the above virtual buffer fullness d(j) as follows:

$$Q(j) = d(j) \times 31/r \quad (25)$$

Here, the reference quantization parameter Q(j) is identical with the aforesaid second quantization parameter Q2.

In the following step A10, the j-th macroblock MB(j) is quantized with the reference quantization parameter Q(j) computed in the step A9. In the following step A11, the macroblock number variable j is incremented by 1. The step A11 goes to the step A12 wherein the judgment is made whether the macroblock number variable j is more than the total number of macroblocks NMB within the nth picture pic(n) or not. When the answer is "NO", i.e., the macroblock number variable j is less than the total number of macroblocks NMB, the control is returned from the step A12 to the step A8. When, on the other hand, the answer is "YES", i.e., the macroblock number variable j exceeds the total number of macroblocks NMB, the step A12 goes to the step A13.

The macroblock number variable j thus serves as a loop counter for repeating the steps A8 to A11 to encode all the macroblocks MB(j) in the present picture pic(n). The entire macroblocks, the first macroblock MB(1) up to the NMB-th macroblock MB(NMB), in the nth picture pic(n) can be thus encoded in turn.

In the step A13, the picture number variable n is incremented by 1. Then the step A13 goes to the step A14 wherein the judgment is made whether the picture number variable n is more than the total number of pictures NPIC or not. When the answer is "NO", i.e., the picture number variable n is less than the total number of pictures NPIC, the control is returned from the step A14 to the step A2. When, on the other hand, the answer is "YES", i.e., the picture number variable n exceeds the total number of pictures NPIC, this routine of the rate controlling process is terminated. The picture number variable n thus serves as a loop counter for repeating the steps A2 to A13 to process all the pictures pic(n) in the present GROUP OF PICTURE. The entire pictures, the first pictures pic(1) up to the NPIC-th picture pic(NPIC), in the present GROUP OF PICTURE can be therefore processed in turn.

According to the aforesaid rate controlling process and in view of the equations (18) to (20), it can be seen that the fullness of the virtual buffer di(j), dp(j), or db(j) is estimated under an assumption that the number of bits used to encode each of the macroblocks within the I, P, or B picture is constant and is not related to any motion information for each of the macroblocks. In this case, the reference quantization parameter Q(j) must be tolerant enough such that possible overflows due to the estimation will not occur. However, this also leads to a sacrifice in the quality of the output bit stream b2.

Therefore, it is an object of the present invention to provide a transcoder, which can more efficiently convert an input MPEG-2 bit stream at a predetermined bit rate into another output MPEG-2 bit stream at a target bit rate, lower than the first bit rate. In particular, the transcoder according to the present invention is implemented to consider, during the estimation of the fullness of the virtual buffers, motion information derived from the variable length decoder, and to improve the estimation using the same.

SUMMARY OF THE INVENTION

The present invention provides a rate controlling method and apparatus for use in a transcoder. The rate controlling method for computing a reference quantization parameter is provided, for use in a transcoder having a variable length decoder, an inverse quantizer, a quantizer and a variable length encoder. The rate controlling method comprising: receiving an input quantization parameter and motion information for each of the macroblocks from the variable length decoder; analyzing the similarity of motion information between a current macroblock and its neighboring macroblocks to compute a scaling factor for the current macroblock when allocated within P- and B-pictures; computing a bit difference between a target outputting bit stream and a real outputting bit stream; estimating the fullness of a virtual buffer to encode the current macroblock in view of the scaling factor; and computing the reference parameter based on a target bit rate, the first quantization parameter and the bit difference.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

The present invention will be described in more details with reference to the accompanying drawings. It should be noted that the drawings are in greatly simplified form and in order to provide a clear illustration and understanding of the present invention.

Figure 3:
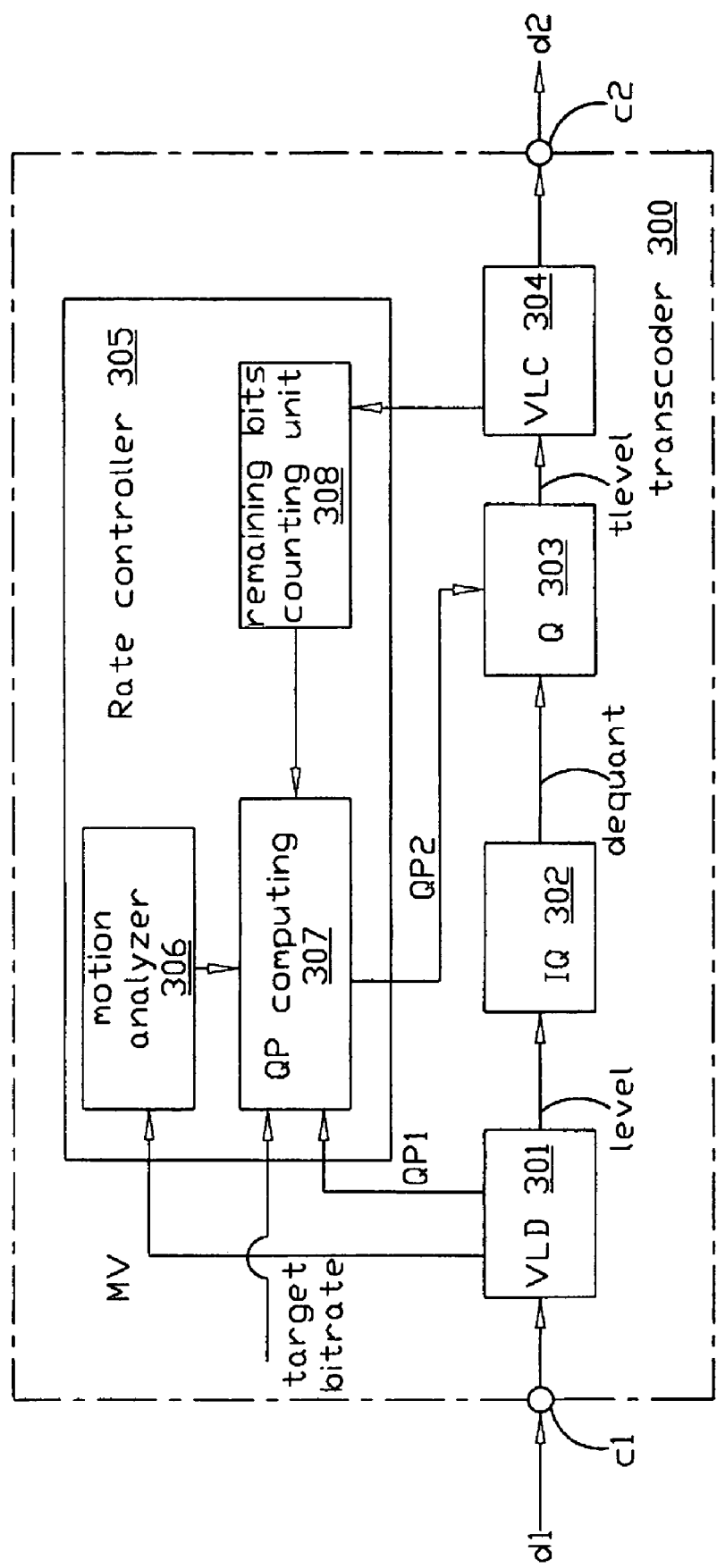
FIG. 3 is a schematic block diagram showing a transcoder in accordance with a preferred embodiment of the present invention.

Referring to FIG. 3 of the drawings, there is shown one preferred embodiment of a transcoder 300 in accordance with the present invention. In the preferred embodiment, the transcoder 300 is designed to input a bit stream d1, such as an MPEG-compliant bitstream and particularly an MPEG-2 bit stream, at a predetermined input bit rate, and to convert the input bit stream d1 into an output bit stream d2 to be output at a predetermined output bit rate, lower than the predetermined input bit rate. For example, the predetermined output bit rate can be selected to be 12M bps for Sony MV, when the predetermined input bit rate is 19.2M bps for HDTV.

The transcoder 300 comprises a variable length decoder 301, referred to as "VLD" in the drawings, a de-quantizer 302, referred to as "IQ" in the drawings, a quantizer 303, referred to as "Q" in the drawings, a variable length encoder 304, referred to as "VLC" in the drawings, and a rate controller 305.

Figure 1:
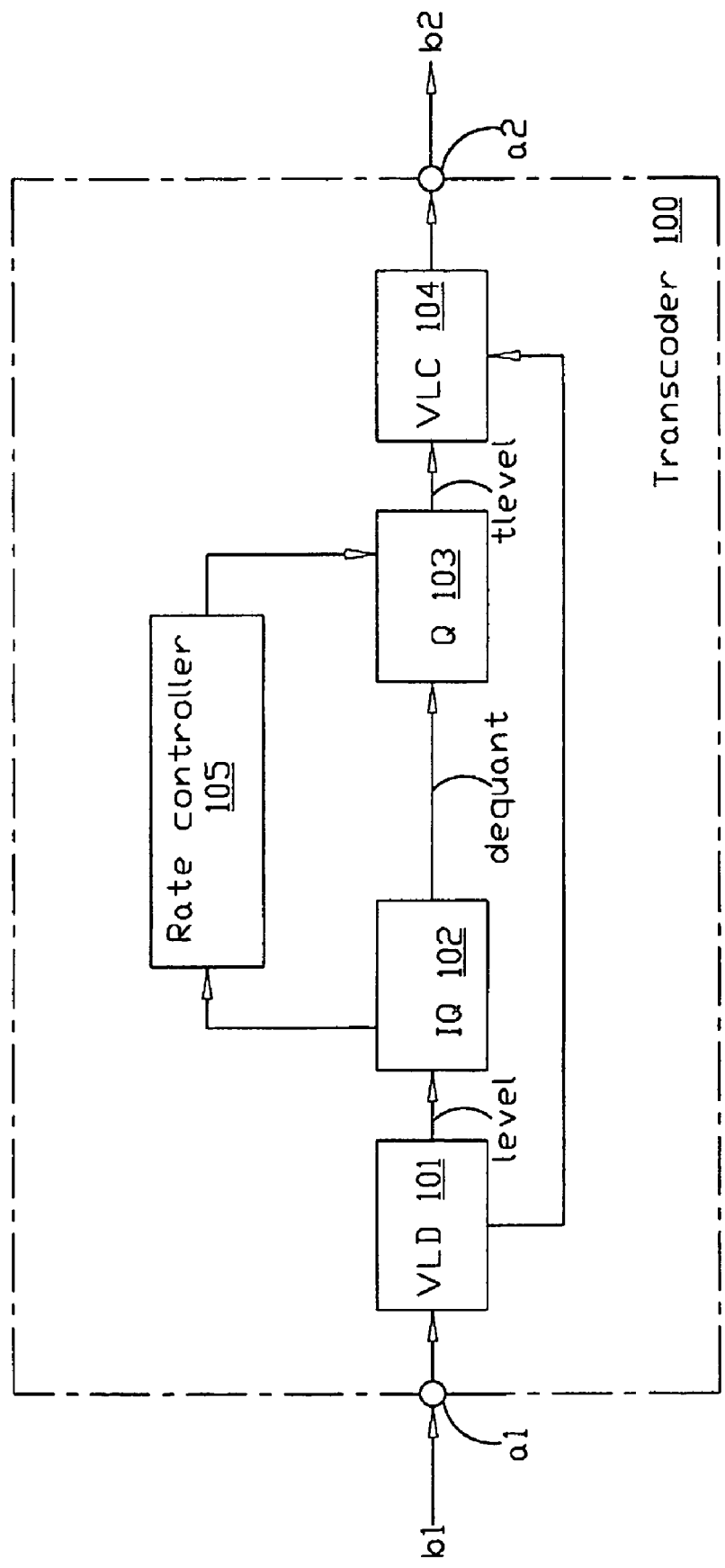
FIG. 1 is a schematic block diagram showing a conventional transcoder.

Similar to the variable length decoder 101 shown in FIG. 1, the variable length decoder 301 is electrically connected to the input bitstream d1 and is provided to decode a coded moving picture sequence signal within the input bit stream b1 to reconstruct a matrix of original quantization coefficients, referred to as "level", and an original quantization parameter, referred to as "QP1". Further, the variable length decoder 301 is designed to reconstruct motion information, such as motion vector, for each of the macroblocks within P or B-pictures, hereinafter referred to as "MV".

Similar to the de-quantizer 102 shown in FIG. 1, the de-quantizer 302 is electrically connected to the variable length decoder 301 and designed to input the matrix of original quantization coefficients level from the variable length decoder 301 and the original quantization parameter QP1. The de-quantizer 302 is further designed to inversely quantize the inputted matrix of original quantization coefficients level with the first quantization parameter QP1 to generate a matrix of de-quantization coefficients, referred to as "dequant". The details of the de-quantizer 302 can refer to the description for the de-quantizer 102, and are skipped for simplicity.

Similar to the quantizer 103 shown in FIG. 1, the quantizer 303 is electrically connected to the de-quantizer 302 and designed to input the matrix of de-quantization coefficients dequant from the de-quantizer 302 and then quantize the inputted matrix of de-quantization coefficients dequant for each of the macroblocks with a reference quantization parameter, referred to as "QP2" hereinafter, to generate a matrix of re-quantization coefficients, referred to as "tlevel". Again, the details of the quantizer 303 can refer to the description for the quantizer 103, and are skipped for simplicity. It is noted that the reference quantization parameter QP2 is calculated by the rate controller 305.

Similar to the variable length encoder 104 shown in FIG. 1, the variable length encoder 304 is electrically connected to the quantizer 303 and designed to input the matrix of re-quantization coefficients tlevel from the quantizer 303 and then encode the inputted matrix of the re-quantization coefficients tlevel to generate the output bit stream d2. Again, the details of the variable length encoder 304 can refer to the description for the variable length encoder 104, and are skipped for simplicity.

The rate controller 305 is electrically connected to the de-quantizer 302 and designed to perform a rate control over the encoding in the transcoder 300, i.e., to calculate a reference quantization parameter, referred to as "QP2" hereinafter, for use in the quantizer 303 for each of the macroblocks. It is noted, as mentioned above, the more accurate the estimation of the fullness of the virtual buffer is obtained, the more accurate the reference quantization parameter can be selected and the more efficient the virtual buffer can be used. Therefore, the quality of the output bit stream d2, when a predetermined output bit rate is determined, can be greatly improved through a better estimation of the fullness of the virtual buffer.

The details of the rate controller 305 are given below.

As shown in FIG. 3, the rate controller 305 comprises a motion analyzer 306, a quantization parameter computing unit 307 and a remaining bit counting unit 308. Similar to the rate controller 105 shown in FIG. 1, the rate controller 305 is designed to perform a rate control over the encoding in the transcoder 300, i.e., to calculate a reference quantization parameter QP2 for use in the quantizer 303 for each of the macroblocks. However, different from the transcoder 100 shown in FIG. 1, the transcoder 300 of the present invention also includes a motion compensation on the estimation of the fullness of the virtual buffer, which is based on the motion information, such as motion vector MV for each of the macroblocks within P- or B-picture. As an example, the motion compensation can be achieved by modifying the estimated fullness of the virtual buffer dp(j) or db(j) with a scaling factor. In particular, the scaling factor can be obtained by comparing the similarity between the motion vector of the current macroblock and the motion vectors of its neighboring macroblocks. As an example, the last term of the equations (19) and (20), i.e., TpX(j−1)/NMB or TbX(j−1)/NMB, is modified with the scaling factor.

The remaining bit counting unit 308 is electrically connected to the variable length encoder 304 and is designed to input an outputting bit stream from the variable length encoder 304 and to count the number of bits encoded by the variable length encoder 304. Also, the remaining bit counting unit 308 is designed to compute a bit difference between a target outputting bit stream and the real outputting bit stream for the previous pictures, such that the number of bits allocated to encode the current picture can be modified based on the bit difference.

The motion analyzer 306 is electrically connected to the variable length decoder 301. The motion analyzer 306 is designed to input the motion vector MV for the current macroblock and the motion vectors for its neighboring macroblocks, and to compute a scaling factor for the current macroblock based on the similarity between the motion vector for the current macroblock and the motion vectors for it neighboring macroblocks.

The quantization parameter computing unit 307 is electrically connected to the variable length decoder 301, the quantizer 303, the motion analyzer 306 and the remaining bit counting unit 308. The quantization parameter computing unit 307 is designed to input the scaling factor from the motion analyzer 306, the original quantization parameter QP1 from the variable length decoder 301, the bit difference between a target outputting bit stream and the real outputting bit stream for the previous pictures, and to compute a reference quantization parameter QP2 for the current macroblock based on a target bit rate, the scaling factor from the motion analyzer 306, and the number of bits allocated to encode the current macroblock which is obtained by reference to the bit difference from the remaining bit counting unit 308.

Figure 4:
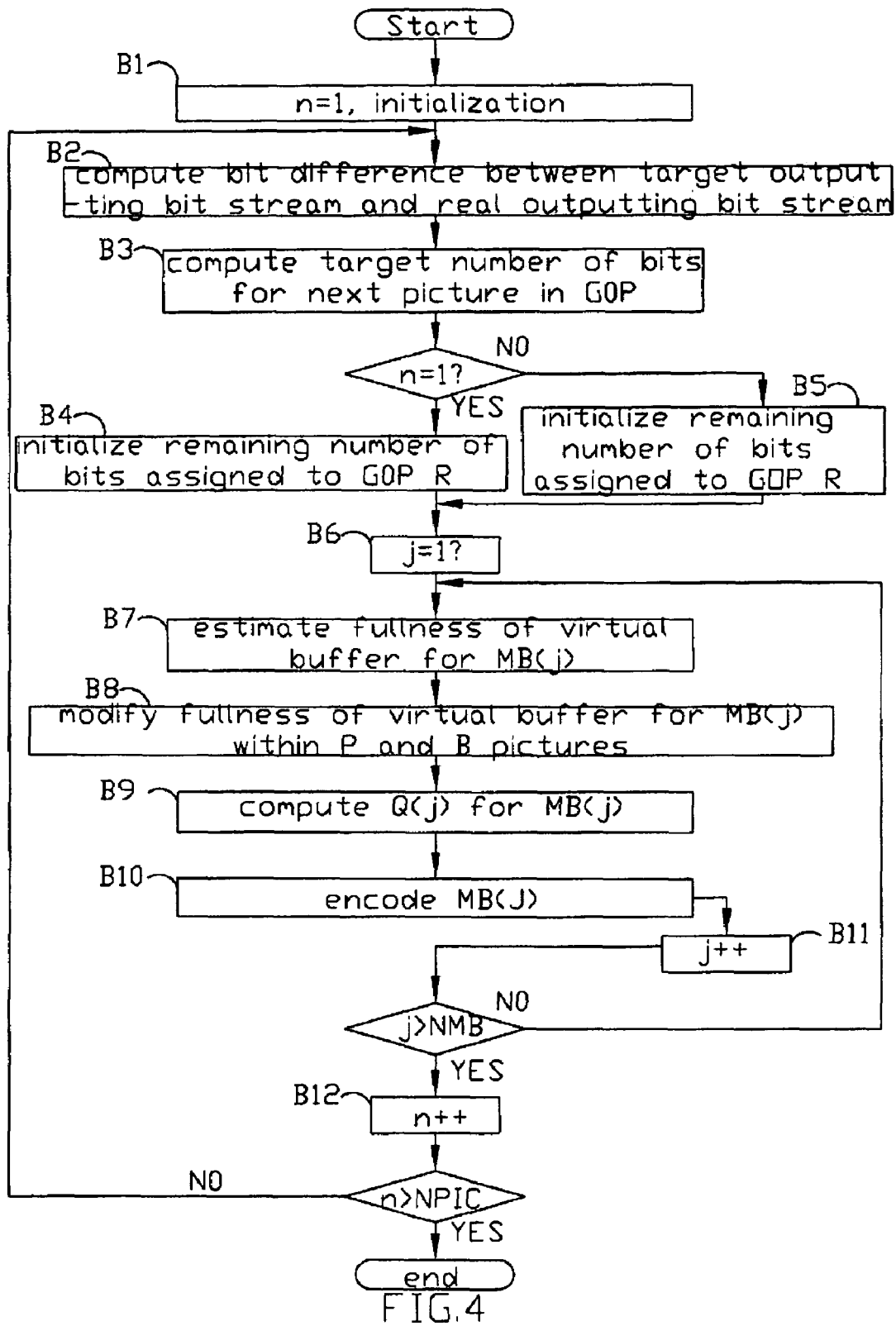
FIG. 4 is a flowchart showing the flow of the process of the rate control in the transcoder shown in FIG. 3.

Here, the rate controller 305 will be illustrated in more details with reference to FIG. 4, which is a flowchart showing the flow of the process of the rate control in the transcoder shown in FIG. 3.

In the step B1, "1" is assigned to the picture number variable n representing a serial number of pictures within the first bit streams b1.

In the following step B2, a bit difference between a target outputting bit stream and the real outputting bit stream for the previous pictures is computed.

In the following step B3, the target number of bits Ti, Tp, Tb for the next picture in the current GROUP OF PICTURES is computed.

Next, the judgment is made whether the picture number variable n is "1" or not, i.e., the current picture is the first picture pic(1) or not. When the answer is "YES", i.e., the current picture is the first picture pic(1), the process goes to the step B4. When, on the other hand, the answer is "NO", i.e., the current picture is not the first picture, the process goes to the step B5. In the step B4, the remaining number of bits assigned to the GROUP OF PICTURES R is initialized as the step A5 in FIG. 2.

Figure 2:
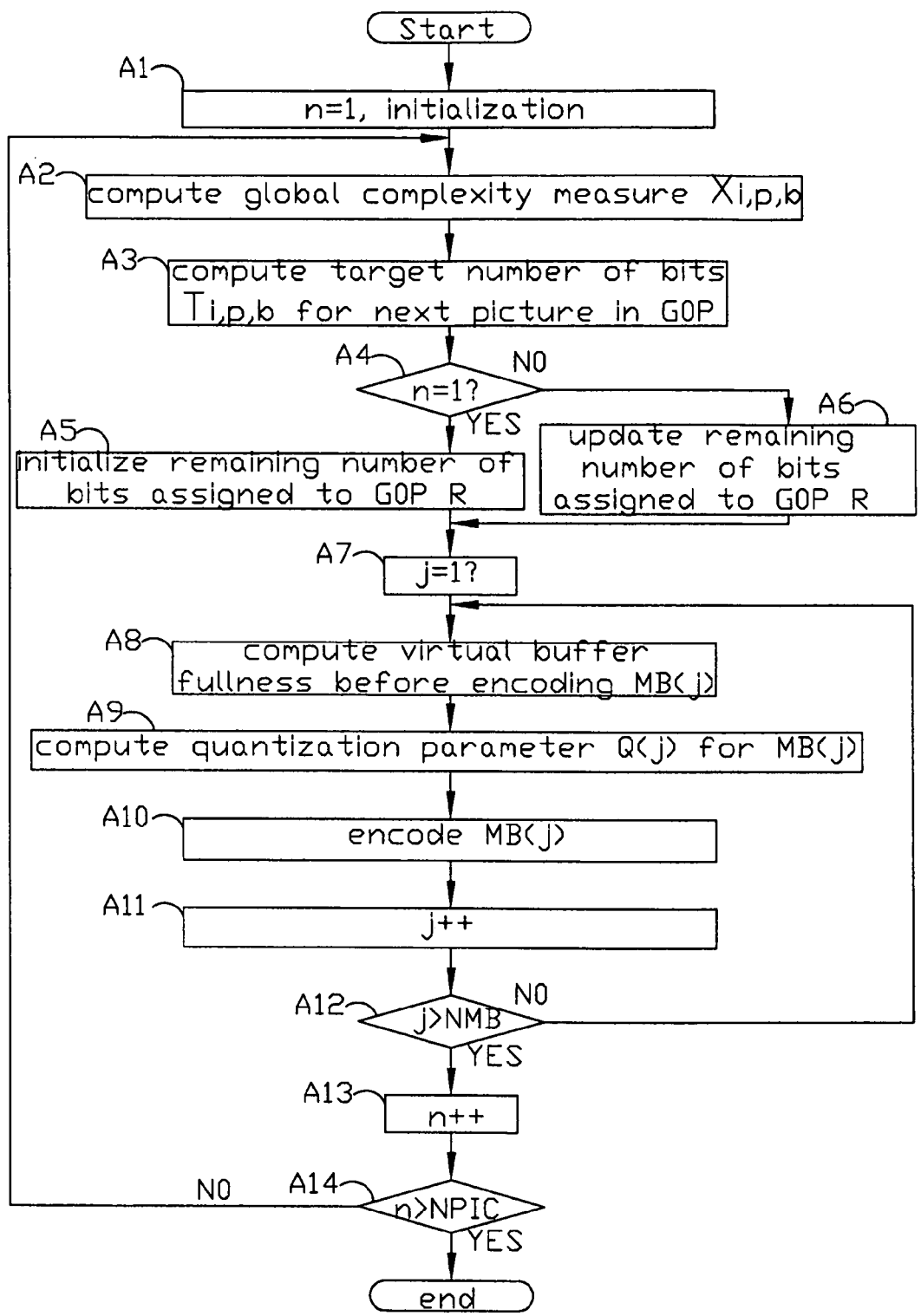
FIG. 2 is a flowchart showing the flow of the process of the rate control according to Test Model 5 of the MPEG-2 in the conventional transcoder shown in FIG. 1.

In the step B5, the above remaining number of bits assigned to the GROUP OF PICTURES R is updated as the step A6 in FIG. 2.

The step B4 or B5 goes to the step B6 wherein "1" is assigned to the macroblock number variable j (j>=1) representing a serial number of macroblocks within one of the pictures. Hereinafter the j-th macroblock in the picture is referred to as "MB(j)".

In the following step B7, the fullness of appropriate virtual buffer di(j), dp(j) or db(j) is computed depending on the picture type before encoding macroblock MB(j) as follows:

$$di(j)=di(0)+B(j-1)-TiX(j-1)/NMB \quad (18)$$

$$dp(j)=dp(0)+B(j-1)-TpX(j-1)/NMB \quad (19)$$

$$db(j)=db(0)+B(j-1)-TbX(j-1)/NMB \quad (20)$$

where B(j−1) is the number of bits generated by encoding all macroblocks in the picture up to including (j−1)th macroblock MB(j−1). NMB is the total number of macroblocks in the picture, and di(0), dp(0), or db(0) is an initial fullness of virtual buffer for I, P or B-picture.

It is noted, the steps B1 to B7 in FIG. 4 are similar to the steps A1 to A8. Therefore, the details of the steps can also refer the corresponding steps and omitted for simplicity.

Next, the fullness of the virtual buffer for P- and B-pictures is further modified with a scaling factor which is obtained by reference to motion information derived from the variable length decoder 301. As an example, the scaling factor is obtained by analyzing the similarity between the motion vector of the current macroblock and the motion vectors of it neighboring macroblocks. In particular, the scaling factor can be defined as the following:

$$d_{factor} = 1 + \text{sign}(MV(j) \cdot MV_{median}) \cdot \frac{(MV(j) \cdot MV_{median})}{(|MV(j)| \cdot |MV_{median}|)}$$

$$\text{sign}(a) = \begin{cases} 1 & \text{if } a \geq 0 \\ -1 & \text{if } a < 0 \end{cases}$$

where "·" is operator for inner product, MV is the motion vector of the current macroblock, and $MV_{median}$ is the median of the motion vectors of its neighboring macroblocks (in the preferred embodiment, four neighboring motion vectors are selected). And the modification can be done as the following:

$$d(j) = d(j-1) + \left(B(j-1) - \frac{T \cdot (j-1)}{N}\right) \cdot d_{factor}$$

With the modification, it can be seen that the fullness of the virtual buffer is decreased when the motion vector of the current macroblock is much similar to the motion vectors of its neighboring macroblocks, and the fullness of the virtual buffer is increased when the motion vector of the current macroblock is much irrelevant to the motion vectors of its neighboring macroblocks, that is represented by the median. That is, the number of bits allocated to encode the current macroblock is decreased when the motion vector of the current macroblock is much similar to the motion vectors of its neighboring macroblocks, and the number of bits allocated to encode the current macroblock is increased when the motion vector of the current macroblock is much irrelevant to the motion vectors of its neighboring macroblocks. More specifically, when the angle between the motion vector of the current macroblock and median of the motion vectors of its neighboring macroblocks are between ±90 degrees, the number of bits allocated to encode the current macroblock is decreased since the current macroblock is much similar to its neighboring macroblocks. Otherwise, the number of bits allocated to encode the current macroblock is increased since the current macroblock is much irrelevant to its neighboring macroblocks. Further, the compensation amount is also determined by the angle between the motion vector of the current macroblock and the median of the motion vectors of its neighboring macroblocks, such as by a cosine function in the preferred embodiment.

It is noted, since there is no motion vectors associated with I-pictures, the modification is performed only on P- and B-pictures.

In the following step B9, the new quantization parameter Q(j) for the current macroblock can be computed using the modified fullness of the virtual buffer, which is identical to the prior art and can be defined as follow:

$$Q(j) = d(j) \cdot 31 \cdot \frac{\text{frame\_rate}}{2 \cdot \text{target\_bitrate}}$$

Then the current macroblock is encoded with the new quantization parameter Q(j), and the process will repeat until all macroblocks within the picture and all pictures within the GROUP OF PICTURES are completed, as shown in the steps B11 and B12.

Summing up, the present invention additionally analyzes the similarity between the motion information, such as motion vector, of the current macroblocks and its neighboring macroblocks to compute a scaling factor, such that a better estimation of the fullness of the virtual buffer can be greatly improved. This will also lead to a more accurate quantaization parameter and an improved output bit stream.

Other embodiments of the invention will appear to those skilled in the art from consideration of the specification and practice of the invention disclosed herein. It is intended that the specification and examples to be considered as exemplary only, with a true scope and spirit of the invention being indicated by the following claims. For example, one embodiment utilizes a computer readable medium with a computer program stored therein. The computer program, when run on a computer, executes a rate controlling method as disclosed above.

What is claimed is:

1. A rate controlling method for computing a reference quantization parameter, used in a transcoder having a variable length decoder, an inverse quantizer, a quantizer and a variable length encoder, the rate controlling method comprising:

receiving an input quantization parameter and motion information for each of the macroblocks from the variable length decoder;

analyzing the similarity of motion information between a current macroblock and its neighboring macroblocks to compute a scaling factor for the current macroblock when allocated within P- and B-pictures;

computing a bit difference between a target outputting bit stream and a real outputting bit stream from the variable length encoder;

estimating the fullness of a virtual buffer to encode the current macroblock in view of the scaling factor; and computing the reference parameter based on a target bit rate, the first quantization parameter and the bit difference;

wherein said motion information is a motion vector, and said scaling factor is defined as the following:

$$d_{factor} = 1 + \text{sign}(MV(j) \cdot MV_{median}) \cdot \frac{(MV(j) \cdot MV_{median})}{(|MV(j)| \cdot |MV_{median}|)}$$

$$\text{sign}(a) = \begin{cases} 1 & \text{if } a \geq 0 \\ -1 & \text{if } a < 0 \end{cases}$$

where "·" is operator for inner product, MV is the motion vector of the current macroblock, and $MV_{median}$ is the median of the motion vectors of its neighboring macroblocks.

2. A rate controller for computing a reference quantization parameter, used in a transcoder having a variable length decoder, an inverse quantizer, a quantizer and a variable length encoder, the rate controller comprising:

means for receiving an input quantization parameter and motion information for each of the macroblocks from the variable length decoder;

a motion analyzer for analyzing the similarity of motion information between a current macroblock and its neighboring macroblocks to compute a scaling factor for the current macroblock when allocated within P- and B-pictures;

a remaining bit counting unit for computing a bit difference between a target outputting bit stream and a real outputting bit stream from the variable length encoder; and a quantization parameter computing unit for estimating the fullness of a virtual buffer to encode the current macroblock in view of the scaling factor, and computing the reference parameter based on a target bit rate, the first quantization parameter and the bit difference;

wherein said motion information is a motion vector, and said scaling factor is defined as the following:

$$d_{factor} = 1 + \text{sign}(MV(j) \cdot MV_{median}) \cdot \frac{(MV(j) \cdot MV_{median})}{(|MV(j)| \cdot |MV_{median}|)}$$

$$\text{sign}(a) = \begin{cases} 1 & \text{if } a \geq 0 \\ -1 & \text{if } a < 0 \end{cases}$$

where "·" is operator for inner product, MV is the motion vector of the current macroblock, and $MV_{median}$ is the median of the motion vectors of its neighboring macroblocks.

* * * * *